United States Patent
Beaucoup et al.

(10) Patent No.: US 8,213,596 B2
(45) Date of Patent: Jul. 3, 2012

(54) METHOD OF ACCELERATING THE TRAINING OF AN ACOUSTIC ECHO CANCELLER IN A FULL-DUPLEX BEAMFORMING-BASED AUDIO CONFERENCING SYSTEM

(75) Inventors: Franck Beaucoup, Dunrobin (CA); Michael Tetelbaum, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1524 days.

(21) Appl. No.: 11/392,915

(22) Filed: Mar. 29, 2006

(65) Prior Publication Data

US 2006/0233353 A1     Oct. 19, 2006

(30) Foreign Application Priority Data

Apr. 1, 2005 (EP) .................................... 05252066

(51) Int. Cl.
*H04M 9/08* (2006.01)
(52) U.S. Cl. .................... 379/406.08; 381/122; 381/123

(58) Field of Classification Search .................. 370/286; 379/406.01, 406.1, 406.09, 406.08; 381/122, 381/123; 348/14.08
See application file for complete search history.

(56) References Cited

U.S. PATENT DOCUMENTS

| | | | |
|---|---|---|---|
| 5,428,604 A | 6/1995 | Fuda | |
| 6,049,607 A * | 4/2000 | Marash et al. | 379/406.08 |
| 6,549,627 B1 | 4/2003 | Rasmusson et al. | |
| 2004/0013038 A1 * | 1/2004 | Kajala et al. | 367/119 |
| 2004/0125942 A1 | 7/2004 | Beaucoup et al. | |
| 2004/0125944 A1 * | 7/2004 | Popovic et al. | 379/406.01 |

* cited by examiner

*Primary Examiner* — Fan Tsang
*Assistant Examiner* — Simon King

(57) ABSTRACT

A method and apparatus is set forth for accelerating the total acoustic echo cancellation convergence time in a microphone array full-duplex conferencing system with beamformer. The invention is based on sequentially switching the beamformer to untrained sectors during periods of far-end speech activity and performing real-time cancellation of far-end echo signals from the near-end signals to consecutively adapt and store filter coefficients for the echo canceller corresponding to each sector.

8 Claims, 3 Drawing Sheets

METHOD OF ACCELERATING THE TRAINING OF AN ACOUSTIC ECHO CANCELLER IN A FULL-DUPLEX BEAMFORMING-BASED AUDIO CONFERENCING SYSTEM

BACKGROUND OF THE INVENTION

1. Field of the Invention

The present invention is directed to audio conferencing systems, and more particularly to a method of reducing the training time of an acoustic echo canceller in a full duplex audio conferencing system using beamforming.

2. Description of the Related Art

Spatial directivity is highly desirable for sound pickup in audio conferencing systems for the purpose of attenuating room noises, interference, and reverberations, thereby enhancing the quality of near-end speech. Spatial directivity can be achieved either by utilizing directional microphones or through a combination of beamformer and a plurality of omnidirectional microphones arranged as a microphone array. The latter approach is preferable as it provides greater directivity, flexibility and cost efficiency compared to the use of directional microphones.

Echo effects represent a well known problem in hands-free audio conferencing systems. Undesirable echo effects result from the loudspeaker signal being picked up by the microphone(s) and then transmitted back to the far-end party. The typical industry requirement for echo attenuation is on the order of 40 dB. In the case of a desktop phone, the proximity of the loudspeaker to the microphones, combined with the high loudspeaker volume and required transmit gain, makes the echo problem particularly difficult to deal with. Although beamforming can contribute to the suppression of the loudspeaker echo signal due to its inherent spatial directivity, a practical fixed or adaptive beamformer cannot satisfy this requirement alone. Therefore in practice, conference or speakerphone design requires the use of a traditional Acoustic Echo Cancellation (AEC) in combination with beamforming to achieve high-quality full-duplex operation.

Several prior art references discuss the combination of acoustic echo cancellation with beamforming (see M. Branstein and D. Ward, "Microphone Arrays. Signal Processing Techniques and Applications". Springer Verlag, 2001, and H. Buchner, W. Herbordt, W. Kellermann, "*An Efficient Combination of Multi-Channel Acoustic Echo Cancellation With a Beamforming Microphone Array*", Proc. Int. Workshop on Hands-Free Speech Communication (HSC), pp. 55-58, Kyoto, Japan, April, 2001). In one approach, acoustic echo cancellation is performed on all the microphone signals in parallel, which is computationally intensive. A second approach is to perform acoustic echo cancellation on the spatially filtered signal at the output of the beamformer. The challenge in the latter case results from the fact that the transfer function between the loudspeaker and the spatially filtered signal is time varying as the beamformer changes its look direction. Indeed, each beamformer presents its own set of characteristics that depend on the spatial area it covers, such as the direct path, reflections, background noise and local interference signals. Therefore the AEC has to deal with changes in the echo path each time the beamformer changes its look direction. This can result in a significant degradation of the full-duplex performance.

One method of dealing with the problem of transitioning from sector-to-sector is presented in U.S. patent application Ser. No. 10/306,154, filed Nov. 29, 2002 (Franck Beaucoup and Michael Tetelbaum), entitled "A method of acoustic echo cancellation in full-duplex hands free audio conferencing with spatial directivity". This invention addresses the problem of multiple look directions by storing and retrieving the unique echo canceller information for each sector from dedicated workspaces. This method facilitates echo cancellation once the AEC has already converged (i.e. when the far-end speech has exercised and trained the AEC to the echo path of a particular direction), prior to switching look directions. However, this approach does not address the problem of requiring initial convergence on each sector. For example, when a call is first set up and bi-directional conversation begins, the beamformer will point to a particular spatial sector in response to the first active near-end talker, thereby allowing adaptation of the echo canceller for this particular sector during segments of far-end speech. However, if the talker changes position to an "unused" sector (or a new talker becomes active), then the echo canceller must re-converge on the new sector. This means that all filter coefficients are initially zero for the new sector, resulting in undesirable echo effects because the AEC remains in a "non-converged" state. Until an acceptable level of echo canceller convergence is obtained, the system may be unstable, resulting in echo and howling effects.

Although some measures can be adopted to prevent these effects (for instance, some amount of loss can be applied to reduce the level of the feedback signal), such measures typically degrade the full-duplex performance of the system. Therefore it is an object of an aspect of the invention to reduce the AEC training time as much as possible.

The prior art does not appear to set forth any methods dealing specifically with initial convergence of an acoustic echo canceller in conferencing systems having more than one possible look direction (and correspondingly multiple echo paths). There are, however, several well-known methods of reducing start-up echo and howling effects for a single echo path. These methods are based on various schemes of applying switched loss on the loudspeaker and/or microphone signals until the echo canceller adapts sufficiently to ensure a reasonable level of echo cancellation. For example, see U.S. Pat. No. 4,560,840 entitled Digital Handsfree Telephone, by Hansen Bjorn, assigned to International Standard Electric Corp. However, in general these methods result in a degradation of the subjective quality of the system. It is not known in the art to apply these techniques to an AEC in the case of multiple echo paths, due to the problem of minimizing the total time of convergence on all echo paths, so that the degradation in quality remains minimal.

Another group of prior art methods is based on training the system AEC prior to its use for the first call. These methods make use of training signals played through the loudspeaker at system start-up (i.e. the first time the speakerphone is powered up). One example of such a prior art approach is set forth in U.S. Pat. No. 5,428,604, Training Method for an Echo Canceller for Use in a Voice Conference System, assigned to NEC Corporation. A drawback of this approach is that it requires playback of a loud training signal through the speaker for a time duration that is sufficient to achieve an acceptable level of convergence in the acoustic echo canceller. This training sound may be annoying for the user, especially where the AEC has to be trained for multiple echo paths thereby giving rise to a long duration of the training sound.

SUMMARY OF THE INVENTION

According to the present invention, a method is set forth for accelerating the training of a total acoustic echo canceller connected to the output of a beamformer in a microphone array based full-duplex system, for all possible look directions. The method is based on sequentially switching the beamformer to untrained sectors during far-end speech activity in order to train the AEC on all sectors, without having to wait for the beamformer to be attracted to all sectors by near-end speech activity.

DETAILED DESCRIPTION OF THE PREFERRED EMBODIMENT

Figure 1:
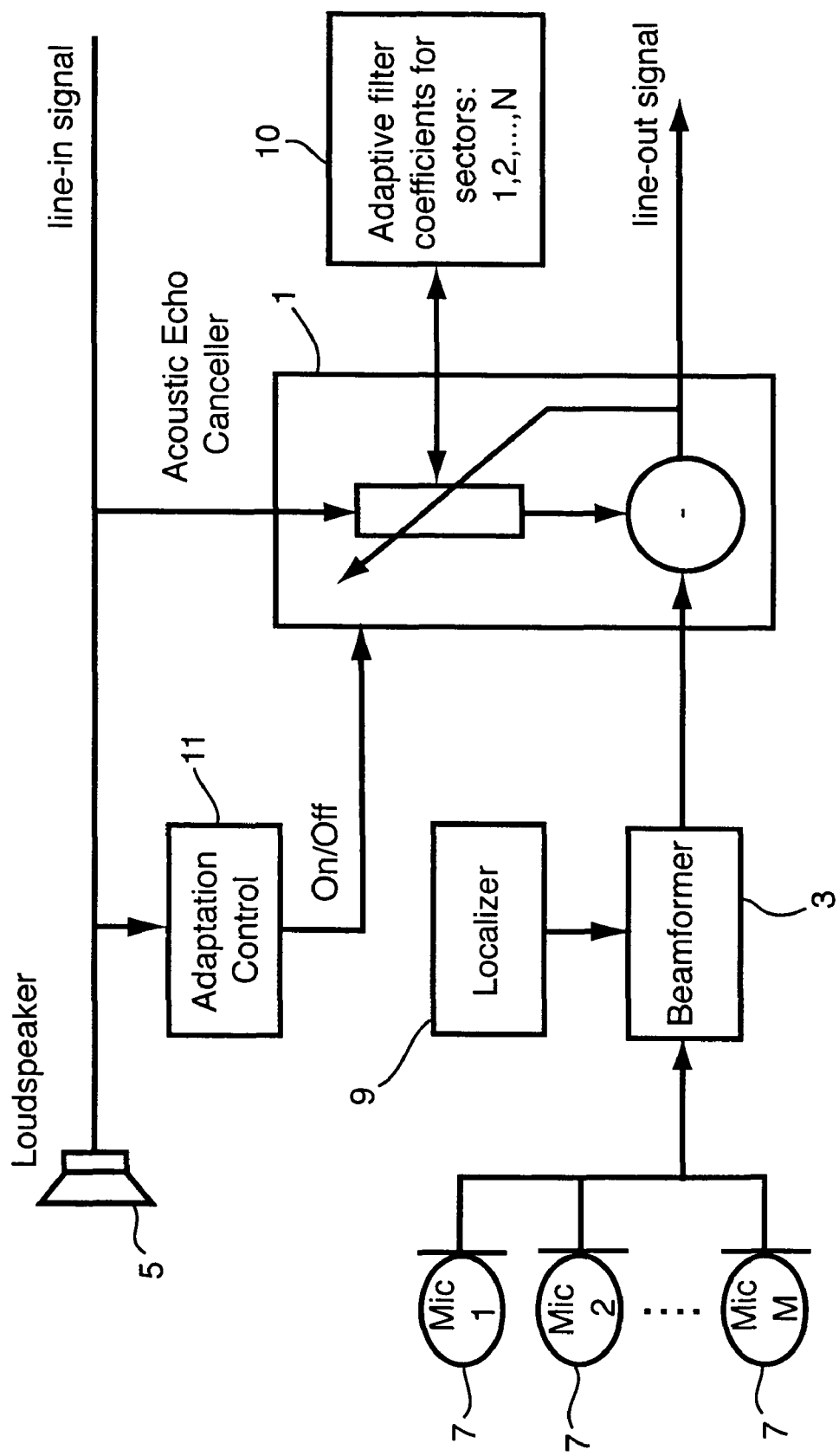
FIG. 1 is a block diagram showing an acoustic echo canceller in a full duplex audio conferencing system with beamformer, according to the prior art.

With reference to FIG. 1, an AEC 1 and beamformer 3 operate on real-time signals such that far-end signals fed to the loudspeaker 5 are also used as the AEC reference signal and signals from microphones 7 are fed to the beamformer 3. The AEC operates at the output of a switched beamformer. The beamformer generates an output signal for a particular spatial area (or look direction) as specified by the Localizer block 9. Various methods can be used to control the AEC convergence process for adaptation and storage of filter coefficients in a workspace 10. In general, the adaptation is performed whenever there is a sufficient level of the reference signal and there is no near-end speech activity (that is, no double-talk) as detected by a Voice Activity Detector (VAD) within the Adaptation Control (AC) block 11.

As set forth in U.S. patent application Ser. No. 9/971,225, filed Oct. 3, 2001 by Franck Beaucoup entitled "Method for handling far-end speech effects in hands-free telephony systems based on acoustic beamforming" the beamformer 3 is frozen during periods of far-end speech. This is in order to prevent frequent changes in look-direction due to reflections of the loudspeaker signal from various objects in the acoustic environment that could otherwise affect echo cancellation and result in undesirable switching effects. Accordingly, the AEC training takes place only on sectors where near-end sound sources (that is, talkers), have been localized by the localization module 9. Consequently, it can take a long time to entirely train the AEC 1 in all look-directions.

To support accelerated training, the method according to the present invention changes the beamformer look direction sequentially to respective sectors that have not yet been trained. These changes are performed during far-end speech activity so that the AEC 1 can adapt on all sectors without the beamformer 3 having to be attracted to every single sector by near-end speech activity. This results in shorter total training time of the beamformer 3. Co-pending European Patent Application No. 05103821.4 by Franck Beaucoup and Michael Tetelbaum, entitled "A method to reduce training time of the acoustic echo canceller in full-duplex beamforming-based audio conferencing systems", sets forth an alternative solution to this problem. However, the method of the present invention alleviates the need to capture training signals as well as the need for multi-tasking, although longer training times are possible in the event of less than fully utilized CPU resources.

Figure 2:
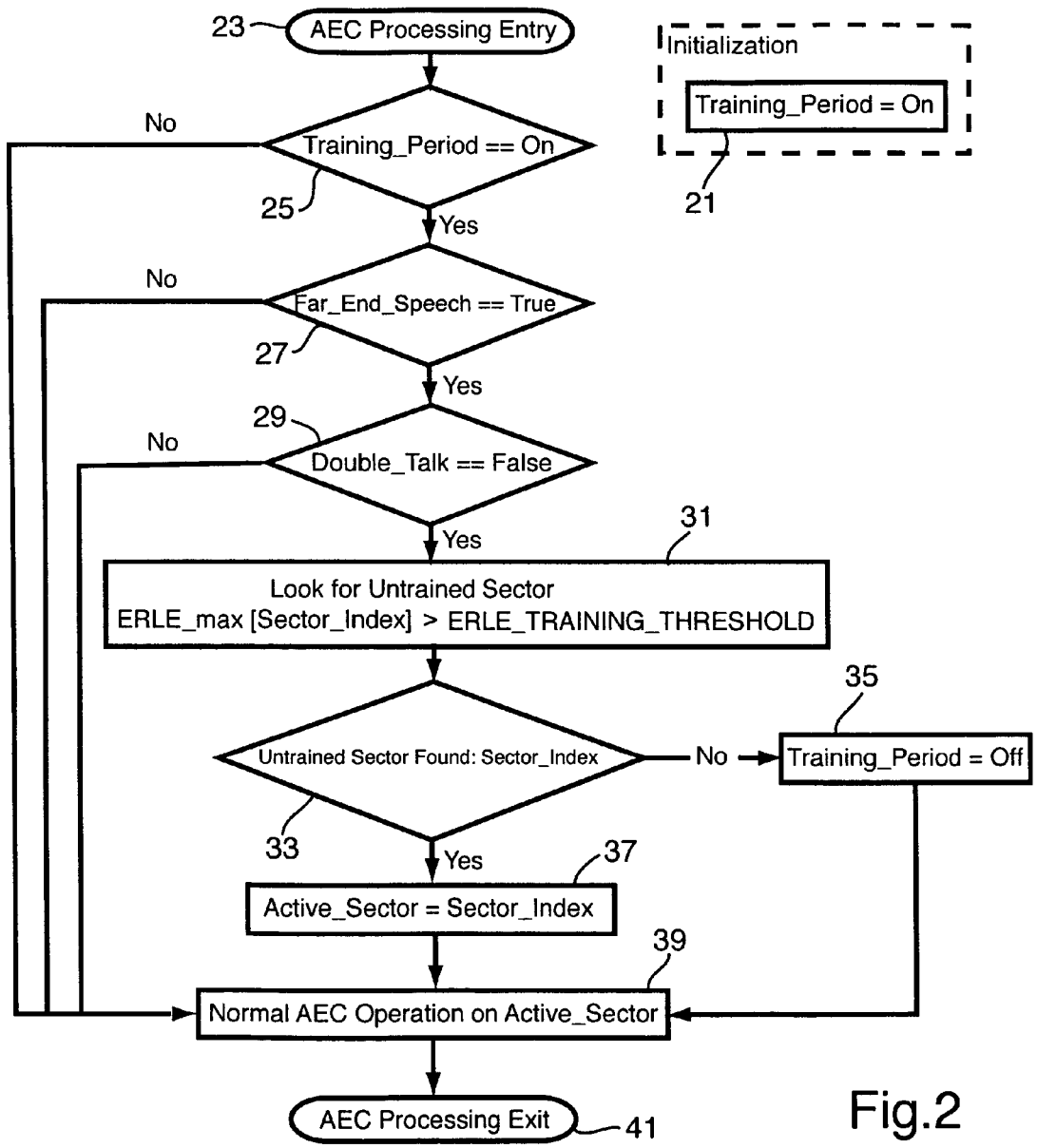
FIG. 2 is a flowchart showing the method steps according to the present invention.
Figure 3:
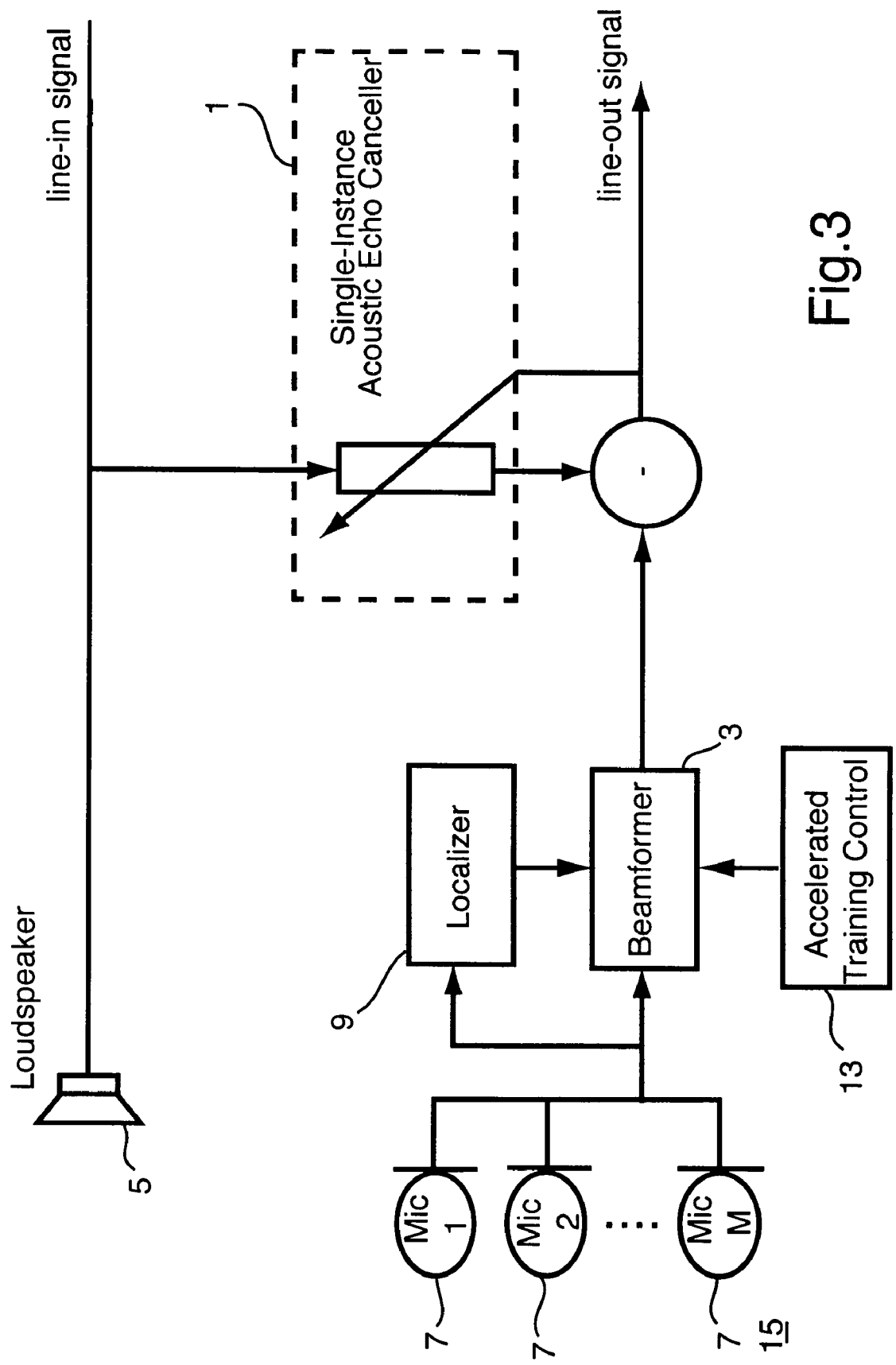
FIG. 3 is a block diagram showing an acoustic echo canceller in a full duplex audio conferencing system with beamformer, according to the present invention.

A flow chart for the method steps of the invention is set forth in FIG. 2, based on the "sector workspace approach" described in U.S. patent application Ser. No. 10/306,154. As discussed in greater detail below, other implementations are possible within the scope of the present invention. The block diagram of FIG. 3 shows that the look direction of beamformer 3 is controlled both by the localization module 9 and the AEC training module 13. Specifically, as discussed below, the localization module 9 controls the beamformer during near-end speech activity whereas the AEC training module 13 controls the beamformer during far-end speech.

In operation, after initialization of the state machine (Training_Period flag set to ON) for carrying out the method steps (step 21), AEC processing begins (step 23). The Training_Period flag is checked (step 25) and if set, then a check is made for the presence of far-end speech (step 27) and the absence of double-talk (step 29). If both of these conditions are true then module 13 assumes control of the beamformer 3 to locate the next sector (i.e. look direction) for which AEC 1 remains untrained; that is, for which the maximum ERLE (ERLE_max) is below an ERLE_TRAINING_THRESHOLD (step 31), an exemplary value for which is 20 dB. The maximum ERLE (i.e. ERLE_max) is a buffer that keeps track of the maximum ERLE for each sector since DSP start up. For totally untrained sectors (where no convergence has yet been attempted), the value is 0 dB. For very well trained sectors, a typical value is in the order of 30 to 35 dB. Therefore, the test ERLE_max[SectorIndex]<ERLE_TRAINING_THRESHOLD (step 31) means that a sector is considered untrained as long as the best ERLE that has been achieved on the indicated sector does not exceed the threshold ERLE_TRAINING_THRESHOLD.

Upon locating an untrained sector (i.e. a "Yes" branch at step 33), the located sector is activated (step 37). Otherwise, (i.e. a No branch at step 33) the Training_Period flag is cleared (step 35). After activating the sector (step 37) or clearing the Training_Period flag (step 35), normal AEC operation continues on the active sector (step 39) and AEC processing terminates (step 41). A "No" branch from any one of steps 25, 27 or 29 also results in a resumption of normal AEC operation, where beamformer control reverts to the localization module 9.

Some conferencing systems incorporate visual indicators to inform the user about the direction of the beamformer, such as discussed in U.S. patent application Ser. No. 10/223,064, filed Aug. 15, 2002 (F. Beaucoup, J. Fletcher, P. Mequon and G. Thompson. "System and method of indicating and controlling sound pickup direction and location in a teleconferencing system"). It is contemplated that, in the context of the present invention, it is not necessary that changes in look direction triggered by the AEC training module 13 be reflected by the visual indicators during far-end speech. At the end of each far-end speech period, the beamformer 3 can be switched back to the previous look direction (sector) so that it matches the direction shown by the visual indicator. This makes the switching of the beamformer look directions for the training purposes unnoticeable to the user.

As indicated above, a key aspect of the present invention is that the module 13 rather than the localization module 9 controls changes in look direction during far-end speech. The purpose of module 13 is to achieve training of the AEC 1 on all sectors as quickly as possible, without waiting for the beamformer 3 to be attracted to all sectors by near-end speech activity. The exact algorithm (state machine) that is used to control these "training" changes of look direction is not restricted to the particular methodology of FIG. 2. A person of skill in the art will appreciate that any algorithm that searches for untrained sectors and sequentially switches the beamformer 3 into these sectors during far-end speech activity falls in the scope of the invention.

The many features and advantages of the invention are apparent from the detailed specification and, thus, it is intended by the appended claims to cover all such features and advantages of the invention that fall within the sphere and scope of the invention. Several variants are possible within the scope of the present invention.

For example, the flowchart in FIG. 2 shows termination of the training period (Training_Period=OFF) when no untrained sectors are found (i.e. a "No" branch at step 33). One variant is to "restart" the training period when a significant change occurs in the echo path. Most echo cancellers have a mechanism to determine if the echo path appears has changed significantly at any point of time and to distinguish such changes from double-talk (both result in similar symptoms, namely that the error signal becomes large (that is, the ERLE becomes small)). Such double-talk detection and discrimination systems are known in the art. In the context of the present invention, a significant change in the echo path could be characterized, for example, by the ERLE on a given sector suddenly becoming much worse (e.g. consistently 6 dB or 10 dB worse than what would be expected given the level of convergence previously achieved on that sector as measured by the maximum ERLE (ERLE_max[SectorIndex]). However, as indicated above, double-talk detection and discrimination systems are known in the art and the exact mechanism of echo-path change detection does not form part of the present invention, but rather the variant of restarting the training period when a change in echo path is detected during normal operation of the AEC 1. Another variant is to keep the sequential training mechanism permanently active and constantly looking for improvements in the level of convergence for all sectors. For the latter variant, the threshold ERLE_TRAINING_THRESHOLD varies over time to reflect the global level of convergence of the system. Moreover, it is contemplated that both variants set forth above may be combined by resetting ERLE_TRAINING_THRESHOLD to its initial value when a change in echo path is detected.

The system and method of the present invention can be used in any application where one instance of echo cancellation is applied on the switched output of multiple microphones or beamformer(s). Because adaptation is not performed at the same time for all outputs, it is desirable to switch outputs during such times that adaptation can be performed (i.e. during far-end speech) to achieve a desired level of convergence for all possible echo paths.

The many features and advantages of the invention are apparent from the detailed specification and, thus, it is intended by the appended claims to cover all such features and advantages of the invention that fall within the sphere and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. In an audio conferencing system, a method for accelerating a training time of an acoustic echo canceller operating on near-end signals output from a beamformer, comprising:
   detecting periods of far-end speech activity;
   sequentially switching said beamformer to untrained sectors during periods of far-end speech activity; and
   performing real-time cancellation of far-end echo signals from said near-end signals to consecutively adapt and store filter coefficients for said echo canceller corresponding to each of said sectors.

2. The method of claim 1, wherein sequentially switching said beamformer and performing said real-time cancellation occurs only in the absence of double-talk.

3. The method of claim 1, wherein said untrained sectors are characterized by a maximum Echo Return Loss Enhancement IERLE) value less than a predetermined ERLE_TRAINING_THRESHOLD value.

4. The method of claim 3, wherein sequentially switching said beamformer and performing said real-time cancellation restarts in the event of a significant change in echo path detected by said acoustic echo canceller during periods of far-end speech activity.

5. The method of claim 3, wherein sequentially switching said beamformer and performing said real-time cancellation is repeated continuously thereby constantly improving convergence of said acoustic echo canceller for all sectors.

6. The method of claim 5, wherein said ERLE_TRAINING_THRESHOLD value is continually updated to reflect said convergence.

7. The method of claim 6, wherein said ERLE_TRAINING_THRESHOLD value is reset in response to each said change in echo path.

8. The method of claim 4, wherein sequentially switching said beamformer and performing said real-time cancellation is repeated continuously thereby constantly improving convergence of said acoustic echo canceller for all sectors.

* * * * *